United States Patent [19]

Trevino

[11] Patent Number: 5,458,019
[45] Date of Patent: Oct. 17, 1995

[54] FIBER OPTIC CABLE RETAINING GUIDE

[75] Inventor: Joe I. Trevino, North Richland Hills, Tex.

[73] Assignee: Siecor Corporation, Hickory, N.C.

[21] Appl. No.: 233,573

[22] Filed: Apr. 26, 1994

[51] Int. Cl.⁶ ............................................. F16C 1/10
[52] U.S. Cl. .................... 74/502.4; 74/502.6; 385/134; 385/135
[58] Field of Search .................... 385/134, 135, 385/136; 74/502.4, 502.6; 24/518, 540; 248/74.1, 73

[56] References Cited

U.S. PATENT DOCUMENTS

| | | | |
|---|---|---|---|
| 3,991,960 | 11/1976 | Tanaka | 248/73 |
| 4,373,776 | 2/1983 | Purdy | 385/134 |
| 4,418,982 | 12/1983 | Williams | 385/135 |
| 4,502,754 | 3/1985 | Kawa | 385/134 |
| 4,700,913 | 10/1987 | Hirand | 248/73 |
| 5,024,405 | 6/1991 | McGuire | 248/73 |
| 5,233,881 | 8/1993 | Sayen et al. | 74/502.6 X |
| 5,354,102 | 10/1994 | Carman | 74/502.4 |

FOREIGN PATENT DOCUMENTS

| | | | |
|---|---|---|---|
| 3428919 | 2/1986 | Germany | 74/502.4 |
| 60-30817 | 2/1985 | Japan | 74/502.4 |

*Primary Examiner*—Vinh T. Luong
*Attorney, Agent, or Firm*—J. David Abernethy

[57] ABSTRACT

A fiber optic cable retaining guide is adapted to be used with fiber optic cross connecting and inter-connecting devices. The guide is an open bottom and open top box having a back wall, a front wall, and two end walls with a retainer plate, the movement of which can vary a certain portion of the space delimited by the box elements and which has one surface coated with an elastomeric material to form a gasket, the other gasket being an elastomeric coated end wall of the end wall opposite to the elastomeric coated surface of the retainer plate. The front wall is hingeably attached to permit easy entry and removal of fiber optic cables into and out of the space delimited by the front wall, back wall, an end wall, and the movable retainer plate.

12 Claims, 2 Drawing Sheets

FIBER OPTIC CABLE RETAINING GUIDE

FIELD OF THE INVENTION

The invention relates to devices known in the fiber optic cable art as fiber distribution centers, which are devices that provide fiber optic cable interconnection and cross-connection facilities between outside plant cables and optoelectronic equipment in a central office, computer room, or remote terminal equipment location. Such devices are sold to the public by one United States manufacturer under the trademark of FDC.

BACKGROUND OF THE INVENTION

A typical state of the art fiber distribution center comprises two spaced apart upstanding "U" shaped channel members with at least two cross members attached thereto forming an open frame, commonly known as an equipment rack or frame. One of the cross members serves as a foot or base so that the frame can be positioned upright. A plurality of rows of snap-in simplex connector parallel modules are fastened to the upright channels to complete the distribution center.

The prior art method of affixing incoming fiber optic cable to the frame channel is illustrated in FIG. 1 by element 27 where there is shown a "U" shaped member (elements 28 and 30) nested inside of a "U" shaped channel composed of elements 17 and 14. A ty-wrap 29 is used to encircle the incoming cable 16 and the "U" shaped member. Because the ty-wrap member has a tendency to apply a crushing force to the cable jacket, undesirable microbending of the optical fibers can occur. To add or remove cables, it is necessary to cut the incumbent ty 29 and have another one on hand as a replacement. Furthermore, once the outer surface area of the "U" shaped member has been occupied with cables, additional cables can be added only by ty-wrapping one cable to another, increasing the probability that micro bending will occur and the difficulty of accessing any given cable. It is towards the solution of these problems that the invention is directed.

BRIEF DESCRIPTION OF THE INVENTION

The invention is an open bottom and open top box with a retainer plate, the movement of which can cause a certain portion of the space delimited by the open top and bottom box to be increased and decreased at will. One surface of the retaining plate is coated with an elastomeric material to form one part of a gasket and an opposing end member of the box is likewise coated to form the other gasket surface. Between these two surfaces fiber optic cables are retained. The box members are hinged one to another so that the entire interior of the box can be exposed and closed, permitting the addition of or removal of cable members as desired. The retaining plate has protrusions thereon which can be aligned with slots in the front and back wall of the box, thereby permitting the retaining plate to be moved in one direction to increase or in another direction to decrease the volume partially delimited by the gasket members for the affixation of the incoming fiber optic cable to the frame channel to which the box is ultimately fastened.

DETAILED DESCRIPTION OF THE INVENTION

Figure 1:
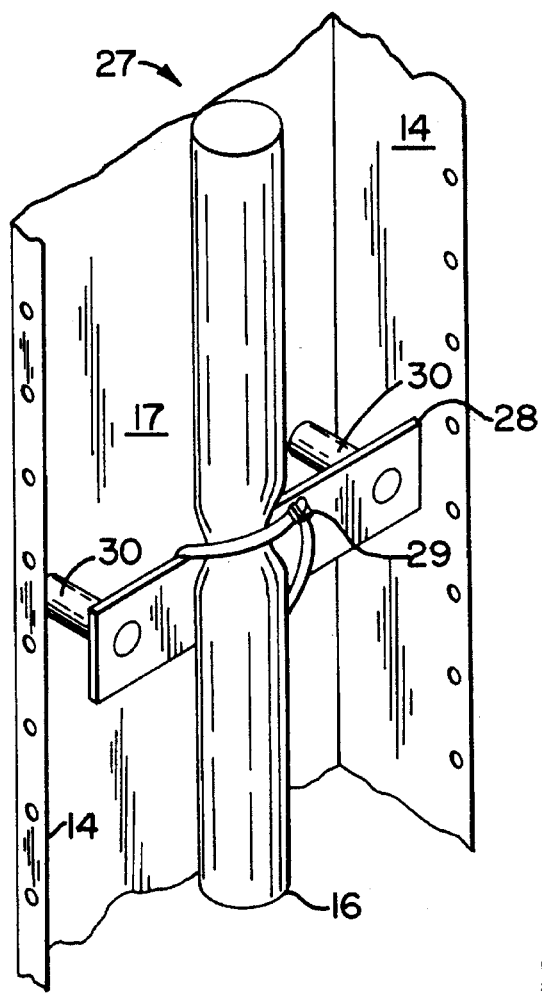
FIG. 1 is an isometric view of prior art device relative to affixing incoming optical cable to a channel of a fiber distribution center.
Figure 2:
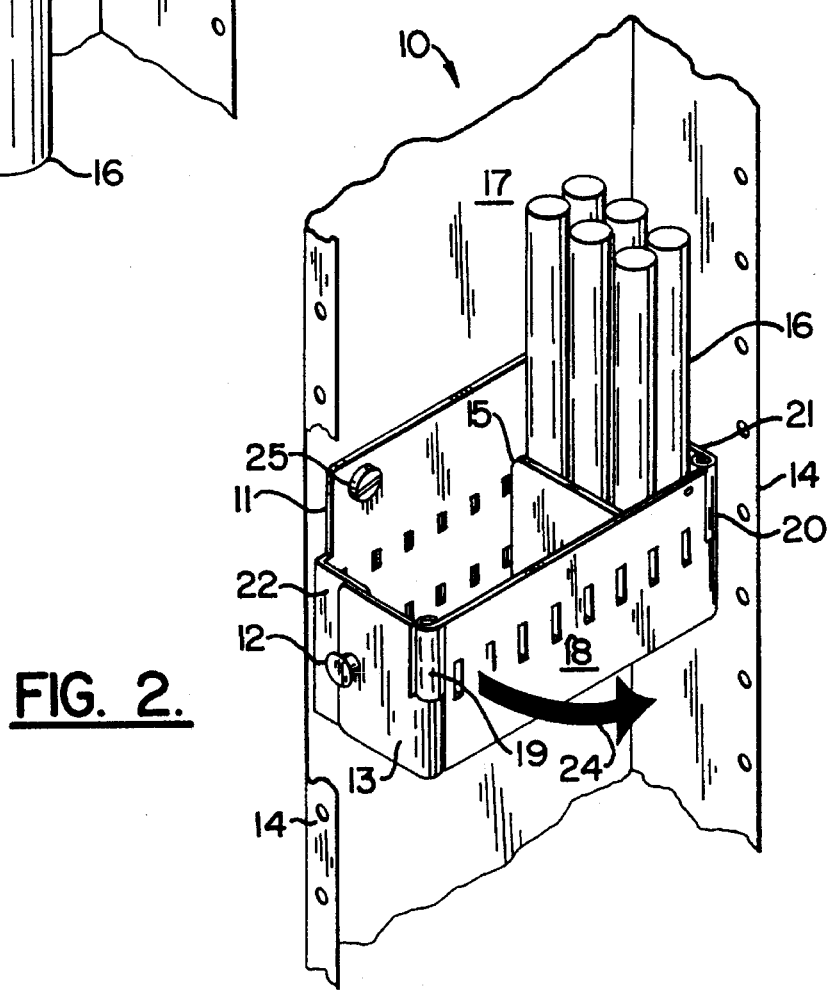
FIG. 2 is an isometric view of the invention

Referring to FIG. 2, the invention is shown as element 10. A "U" shaped channel composed of cross piece 17 and two laterally opposing upstanding side members 14 are shown. Two or more of these channels along with one or more cross members (not shown) form a frame. A cable retaining guide in the form of an open top and open bottom is shown made from back wall 11 (affixed by bolt member 25 to cross piece 17) having laterally extending end walls 21 and 22 and a "L" shaped member composed of front wall 18 and door 13. Front wall 18 is hingeably affixed to end wall 21 and door 13 is hingeably affixed to front wall 18 and removeably attached to end wall 22. Cables 16 are disposed in the variable space delimited by retainer plate 15, part of front wall 18, end wall 21 and a portion of back wall 11. Knob 12 is affixed to door 13 and is adapted to removeably engage door 13 to end wall 22.

Figure 3:
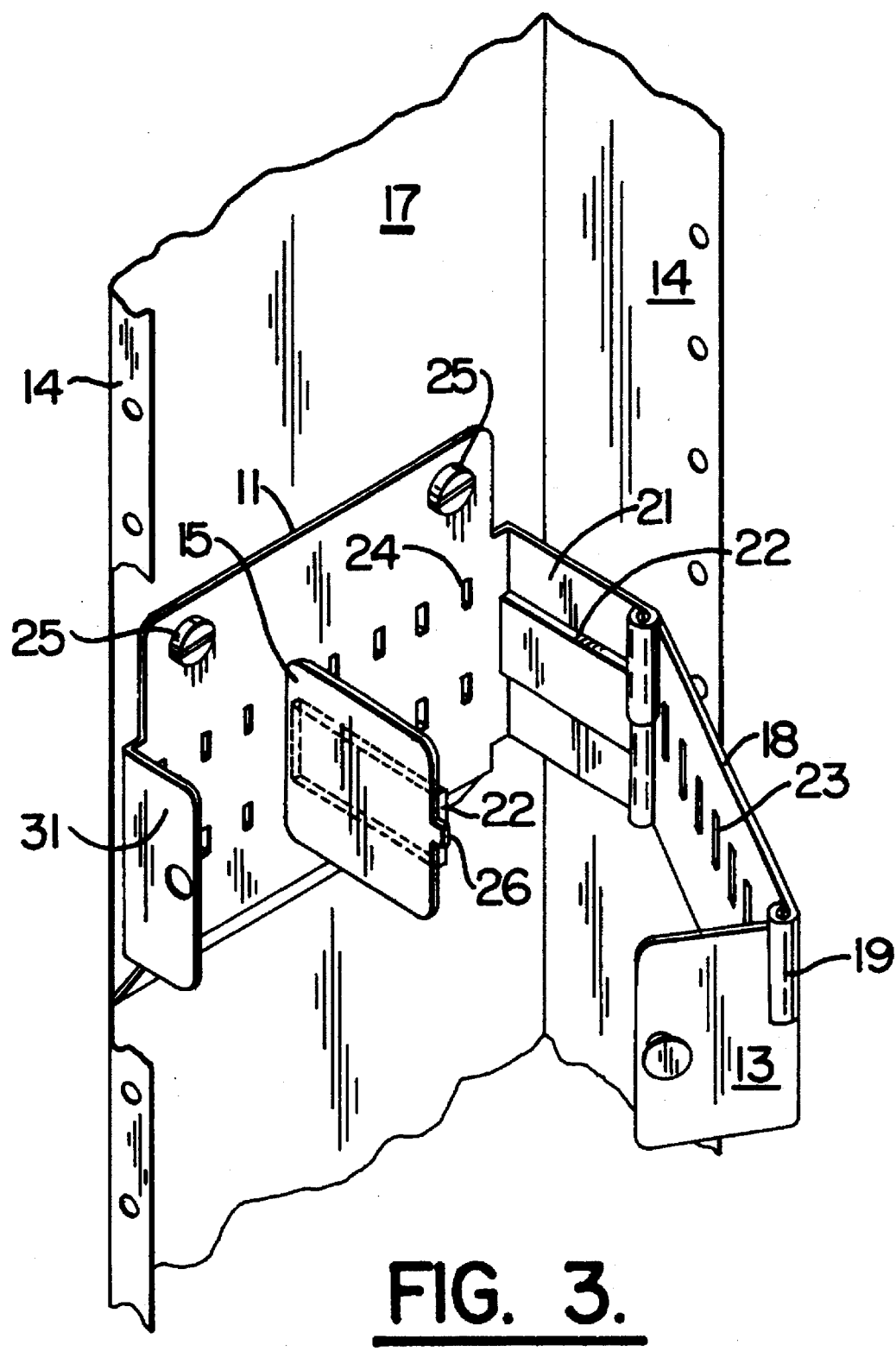
FIG. 3 is another isometric view of the invention showing the internal members of the open top open bottom box of FIG. 2.

Referring to FIGS. 2 and 3, the retaining guide is shown with door 13 disengaged from end wall 31 and "L" shaped member (elements 13 and 18) rotated in the direction of arrow 24 about hinge 20 to expose the interior of the open top and open bottom box. Gaskets 22, made from any suitable elastomeric material such as rubber, foamed or not foamed, may be disposed on the interior surface of end wall 21 and moveable retainer plate 15 thus providing a resilient cushion for cables 16 when they are so confined by the retaining guide as shown in FIG. 2.

Receiving means such as 33 are provided in back wall 11 adapted to receive protrusion 26 on the terminal end portion of retainer plate 15 (not shown). In like manner, receiving means such as slots 23 are provided in front wall 18 adapted to receive protrusion(s) 26 of retainer plate 15.

From the above description, it can be readily seen that retainer plate 15 can be moved to the right to reduce a certain space and in opposite manner to increase such space.

The following claims are intended to cover the specific embodiment as set forth herein as well as modifications, variations, and equivalents.

I claim:

1. A cable retaining guide, comprising:
    (a) a back wall having means to affix said back wall to a surface;
    (b) first and second spaced apart end walls, one terminal portion of said first end wall attached to said back wall and one terminal portion of said second end wall attached to said back wall;
    (c) an "L" shaped closure device composed of a front wall and a door, one terminal portion of said wall hingeably attached to a terminal portion of second spaced apart end wall and another terminal portion of said front wall hingeably attached to said door;
    (d) receiving means in said back wall and said front wall; and
    (e) a retainer plate removeably received in said receiving means, forming with said front wall, said back wall and said second end wall a space adapted to receive one or more optical cables.

2. The retaining guide of claim 1 further including a gasket formed of elastomeric material disposed on the inner surface of said retaining plate and said second wall.

3. The retaining guide of claim 1 wherein said door is removeably attached to said first end wall.

4. The retaining guide of claim 1 wherein said receiving means are a plurality of slots adapted to receive protrusions disposed on opposing lateral terminal portions of said retainer plate.

5. The retaining guide of claim 4 wherein said retainer plate has on each of opposing terminal portions a protrusion adapted to be received in said plurality of slots.

6. The retaining guide of claim 1 further including one or more fiber optic cables disposed in said space.

7. A frame for receiving cables comprising:

(a) a "U" shaped member;

(b) an open top and open bottom box, nested inside of and affixed to said "U" shaped member, said box having opposing front, back and end walls;

(c) an adjustable retainer plate inside of said box removeably affixed to said front and back wall; and (d) a gasket formed of elastomeric material affixed to one surface of said retaining plate and a gasket formed of elastomeric material affixed to one inside surface of said end wall.

8. The frame of claim 7 wherein said front wall of said box is hingeably attached to one of said end walls.

9. The frame of claim 8 further including a door wherein said front wall of said box is hingeably attached to said door.

10. The frame of claim 9 wherein said door is removeably attached to one of said end walls.

11. The frame of claim 7 further including a plurality of slots in said back and front 12. The frame of claim 11 further including a protrusion on each of opposing terminal portions of said retainer plate, said protrusions removeably received in said slots.

* * * * *